July 9, 1935.  J. V. MEIGS  2,007,656
DISTILLATION OF TAR
Filed Feb. 14, 1929  4 Sheets-Sheet 4
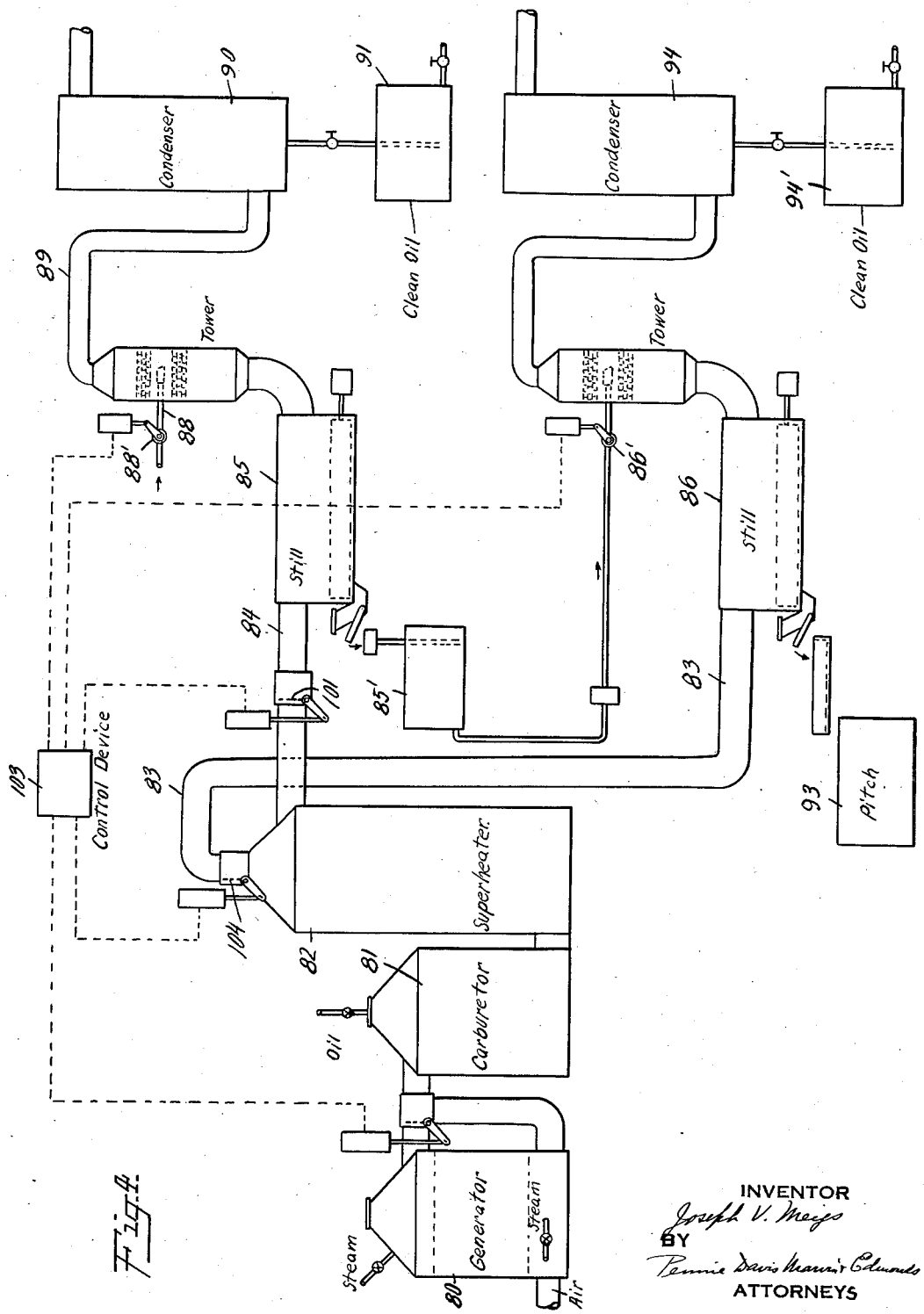

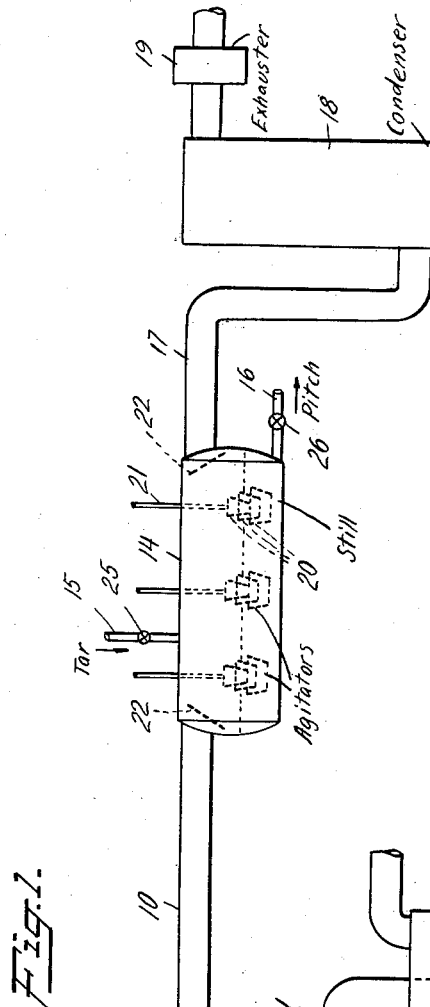

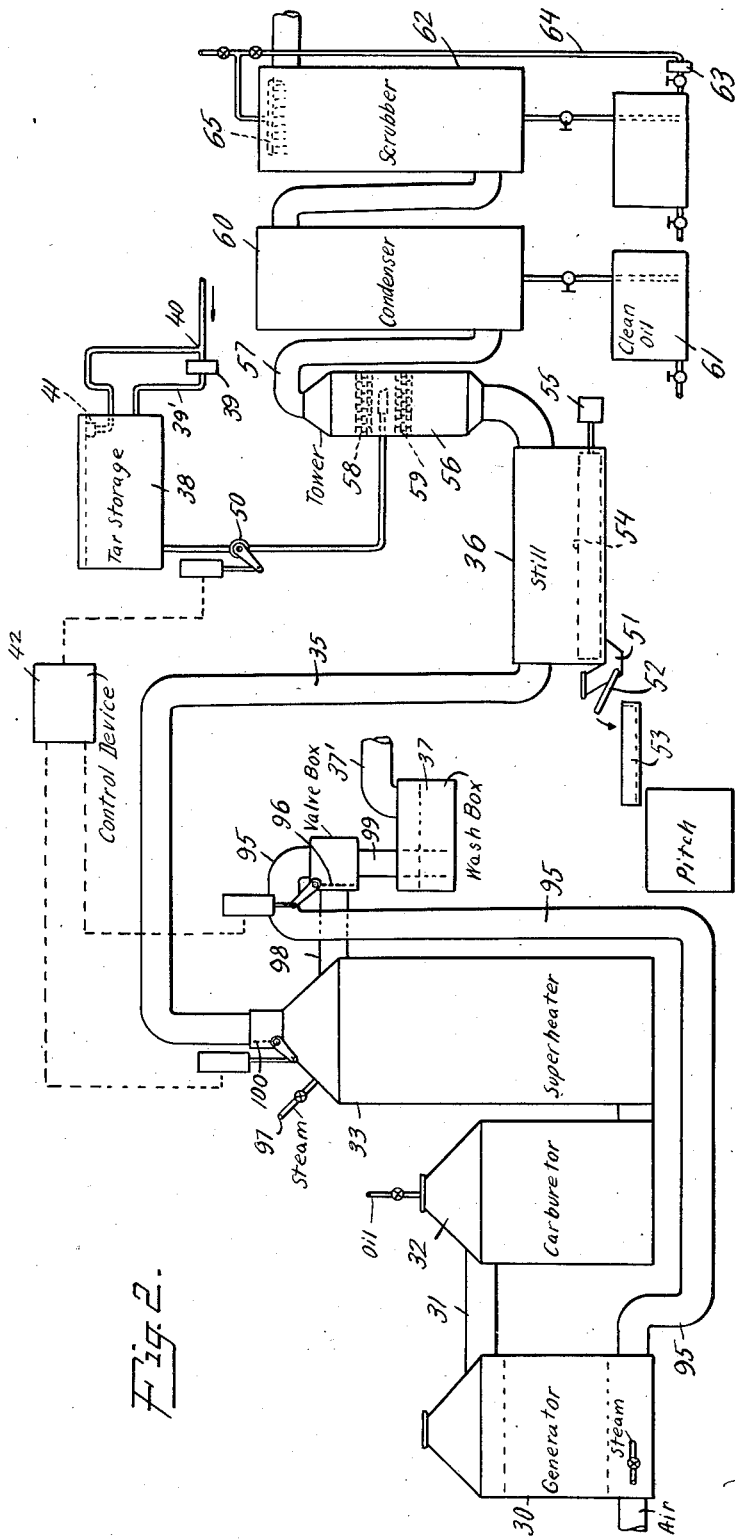

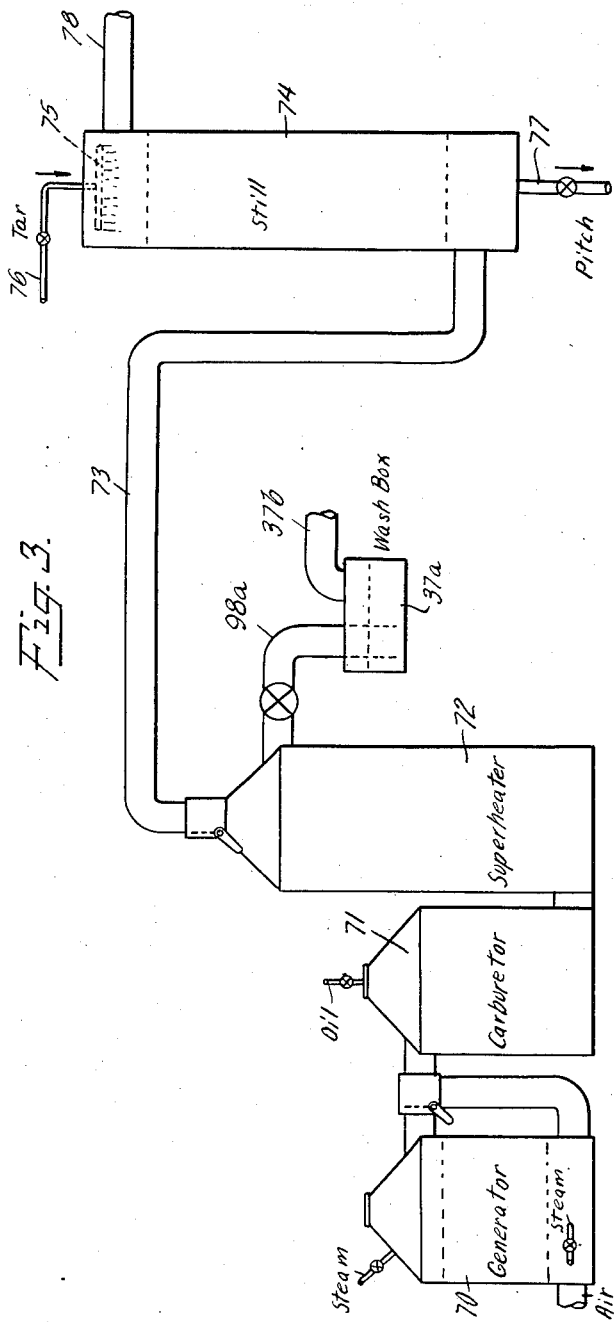

Patented July 9, 1935

2,007,656

UNITED STATES PATENT OFFICE 2,007,656

DISTILLATION OF TAR

Joseph V. Meigs, Brooklyn, N. Y., assignor to The Barrett Company, New York, N. Y., a corporation of New Jersey Application February 14, 1929, Serial No. 339,838

2 Claims. (Cl. 196—76)

This invention relates to the operation of gas plants of the types known as water gas, carburetted water gas, or "blue" gas plants, and provides an improved process for the operation of such plants, as will be hereinafter described and as claimed.

In the ordinary method of operating such plants, a bed of fuel contained in a generator is brought to a high temperature or incandescence by a blast of air and the hot waste products of combustion from this operation are at a high temperature and contain a great deal of available heat. In the ordinary method of operation the hot waste gases escaping from the apparatus are permitted to escape into the atmosphere, in some cases, and in others are used for the generation of steam in waste heat boilers. Following the blasting or blowing operation, the fuel thus heated to incandescence is treated with steam whereby combustible gas is generated. This gas is ordinarily termed water gas or blue water gas. To increase the heating value of such gas, it may be passed through highly heated apparatus, into which oil is sprayed and in which the decomposed oil products are mixed with the blue water gas and a mixture formed called carburetted water gas. The latter process wherein carburetted blue water gas is formed, requires considerable quantities of oil, such as petroleum oil, and the manufacture of the blue water gas by the decomposition of steam with incandescent fuel demands substantial quantities of steam.

In the manufacture of carburetted water gas, tar is formed by decomposition of the oil used for carburetting purposes, and may also be formed in the process of making blue water gas, as well as carburetted water gas, when bituminous coal is used instead of coke. The tar thus formed separates from the gas when the latter is cooled, and represents a relatively low-grade by-product the disposal of which in some cases at least, presents a problem.

The present invention provides an improved process whereby hot waste gases from the generation of blue gas or carburetted blue gas are utilized for the distillation of bituminous material, such as water gas tar, gas retort tar, and the like, and provides improved apparatus by means of which such distillation may be carried out.

If water gas tar is distilled the distillate oils produced from the distillation by means of the hot waste gases may be employed as a lamp black oil and the residual pitch from the distillation may be employed as fuel pitch or may be disposed of in any other appropriate manner.

The invention provides an improved process and means whereby the tar produced in the gas manufacturing process may be conveniently and economically disposed of and converted into products of increased value. For example, in plants containing a number of carburetted water gas sets, the hot waste gases from a single set may be employed to distill and dispose of the tar produced by many other sets. The hot waste gases are available at high temperatures, as for example from 1,000 to 1,500° F. and the present invention provides means whereby such hot gases from a single set may be utilized to dispose of and to distill the tar from several other sets.

Instead of the tar produced by water gas machines, or carburetted water gas machines, tar from other sources may be distilled as for example coal tar from gas retorts or coke ovens. Mixtures of tars may also be distilled, for example mixtures of retort tar and water gas tar. Blended distillates and blended pitches are thus produced.

The present invention also provides a method and apparatus whereby carburetted water gas or blue water gas is scrubbed and thus purified. In the manufacture of blue water gas or carburetted water gas, the fuel is treated alternately with air and with steam. During the treatment with air, the fuel is heated to a high temperature and hot waste gases are produced. This step is immediately followed by treatment of the fuel with steam, and in this step combustible gas is generated.

The combustible or fuel gas is, like the waste gases, available at high temperatures such as 1000 to 1500° F., more or less, and in one form of the present invention the hot fuel gas is directly and very intimately contacted with tar or oil, and the hot gas thereby thoroughly scrubbed and purified from tarry constituents. At the same time, the tar or oil is distilled, and the lighter constituents thereof are volatilized. The resulting mixture of oil vapors and fuel gas may then be passed to condensers or the customary cooling apparatus and storing apparatus. The residue from this scrubbing and preliminary distilling operation may then, in a separate apparatus, be directly and intimately contacted with the hot waste gases from the gas-making process, and in this subsequent operation heavier oils are distilled and volatilized into the hot waste gases. The mixture of heavier constituents and hot waste gases is then subjected to cooling or cooling and scrubbing, to recover such heavier constituents and the uncondensed gases may then be permitted to escape into the atmosphere.

The distillation of tar by means of the hot waste gases may take place indirectly, as for example, in an apparatus which comprises a pipe coil through which the tar passes and in which it is indirectly heated and distilled by the transfer of heat from the hot waste gases in contact with the external surface of the pipe coil.

In the preferred form of the present invention, however, the distillation of tar takes place by direct and intimate contact of the tar or oil with the hot waste gases. This contact is preferably of such an intimate character that the temperature of the hot gases is reduced to a low temperature, that the gases are saturated with distillate vapors and that consequently a given quantity of hot gases distills a large quantity of the tar. The amount of tar thus distilled will depend upon the temperature and composition of the hot gases and the temperature and composition of the tar which is distilled, the extent to which the tar is distilled, and the degree of intimacy of contact between hot gas and tar. In the case of carburetted water gas the ratio between the quantity of waste gas and finished fuel gas produced is about 2 to 1, and the distillation capacity of the hot waste gas for dry water gas tar preheated to about 100° C. prior to distillation will vary from 8 to 40 gallons of tar, more or less, per 1000 cubic feet of fuel gas, depending upon the extent to which the tar is distilled, and the temperature of the hot waste gas, and the temperature to which the latter is cooled by its contact with the tar, and other conditions. The tar may be distilled to only a slight extent, and yield a very light distillate and a soft pitch residue, or the distillation may be much more extensive whereby as much as 75 to 85 percent of oil may be distilled from the tar and whereby a hard pitch residue with a melting point of, for example, 400° F., or higher, may be obtained.

In the process of distillation of the tar or oil, the batch, or continuous method may be used. According to one advantageous manner of carrying out the former method, a quantity of tar is placed in a still, as for example a tank still, provided with agitating means which serve to throw the tar up into the vapor space of the still, where the tar is brought into contact with the hot waste gases passing through the still from the generator of a blue water gas set or the superheater of a carburetted water gas set. The mixture of waste gas and oils volatilized in the still is then passed to a condenser where condensation of the volatilized oil takes place, and from which the cooled waste gas may be permitted to escape into the atmosphere. Distillation in the still is continued to the extent desired, at which time the distillation residue is drawn off and utilized as fuel, or for other purposes, and the still is then charged with a fresh batch of tar or oil, which is, as before, distilled by contact with hot waste gas. During the period when the hot residue is being withdrawn and the fresh charge added to the still, the hot waste gas may continue to pass through the still, or it may be diverted to another previously charged still, which operates alternately with the first named still; or, during the charging period mentioned, the hot waste gas may be permitted to escape into the atmosphere.

The production of blue water gas or carburetted water gas is a process made up of continuously repeated cycles, which in turn consist of regularly recurring periods, which are termed "blows" and "runs" respectively. Treatment of the fuel with air is called the "blow" and treatment of the fuel with steam is called the "run". The "run" period or periods and the "blow" period, constitute a cycle. Hot waste gas from a single water gas set is therefore produced not continuously, but in regularly recurring impulses or periods.

In the preferred form of the invention, instead of acting upon a mass of tar which remains intact as a batch until distilled to the desired extent, the hot waste gas acts upon and distills a body of tar which moves as a whole, either in a continuous stream or in impulses regularly recurring, and coinciding with the impulses or periods in which the hot gas is produced, as above described.

In the preferred form of the present invention, the stream of the hot gases and the stream of tar may move in opposite directions, or in the same direction, or during a portion of the time of contact, the streams may move in the same direction, and during the remainder of the period of contact the streams may move in opposite directions.

Contact between the hot gases and the tar may take place in apparatus of the tower type, in which the hot gases move upwardly against a descending stream or rain of the tar. The tower may contain baffling means, as for example, Raschig rings to prolong the time of contact between the tar and gases and to provide for the exposure of a greater surface of the tar to the hot gases. The tar is distilled by contact with the hot gases and the gases are scrubbed and freed from entrained impurities to a greater or less extent.

The preferred form of the invention comprises the process by which, and apparatus in which the streams of hot gas and tar move horizontally, and the tar is mechanically projected into the stream of hot gas, so that the latter is drenched with tar particles, and thoroughly scrubbed, and the tar is thoroughly distilled.

The present invention provides a method by which advantage is taken of the partial pressure of oil vapor in hot gas to vaporize oil constituents from tars or oils at temperatures substantially below the normal boiling point of such oil vapors at atmospheric pressure. By this method tars and oils may be distilled with substantially less decomposition than by distilling solely with externally applied heat. To recover oils from the mixture of gas and oil vapor, the mixture is cooled below the dew-point of the oil vapor which it is desired to condense. In the case of certain of the lighter constituents of tar, the dew-points of these constituents in the gas may be below that which it is convenient to attain by the use of ordinary cooling water. To avoid the loss of such light constituents when cooled waste gas containing such constituents is vented to the atmosphere, the cooled waste gas containing light oil vapor may be refrigerated to condense the light constituents or may be scrubbed by a solvent for such constituents, whereby they are washed or scrubbed from the waste gas.

The present invention, however, provides an improved method by which only heavier oil constituents are volatilized in the waste gases, and all these oil constituents may be condensed from the cooled waste gas by cooling to such temperatures as may be attained by the use of ordinary cooling water. According to this form of the invention, the tar to be distilled by the hot waste gas is first submitted to a preliminary distillation whereby the lighter constituents of the tar are distilled and recovered. This preliminary distillation may take place by any suitable means, as for example by passing the tar or oil through a pipe coil provided with an expansion chamber or vapor box, and condenser, heating the oil or tar in the pipe coil by hot gases such as combustion gases or waste hot gases, separating the vapors of light oils from the undistilled residue in the vapor box and condensing them in a condenser. Preferably, however, the preliminary distillation described is carried out by bringing the tar into direct and intimate contact with the hot mixture of combustible gas and steam produced in the process of manufacturing the blue water gas or carburetted water gas, as the case may be. The preliminary distillation above described should be carried out to such an extent as to remove from the tar light constituents which otherwise would be distilled in the second or subsequent distillation by hot waste gas, and upon cooling thereof would remain in vapor form and be lost by cooling the mixture of hot waste gas and oil vapors to such temperatures as may by attained by ordinary cooling water and by permitting the waste gas thus cooled to escape to the atmosphere. If the preliminary distillation is carried far enough, the gases and vapors from the second or subsequent distillation need be subjected only to such cooling as may be necessary to condense the heavy oils contained therein.

The invention is of more or less general application to all types of gas manufacturing processes where hot waste gas is produced at high temperatures, such as, for example, 800° to 1600° F., including the back run process of manufacturing carburetted water gas.

The invention will be described more in detail, with reference to the accompanying drawings which illustrate embodiments of the process of the invention, and means for the practice thereof, but it is to be understood that the invention is not limited thereto.

Fig. 1 shows in elevation apparatus particularly adapted for carrying on the process on a batch basis;

Fig. 2 shows a modified arrangement for applying the invention to carburetted water gas;

Fig. 3 shows still another modification of apparatus adapted to carrying out the invention; and Fig. 4 shows a modified form of apparatus in which the carburetted water gas is scrubbed with tar and the residue from the scrubbing operation is distilled by the hot waste gases.

In the drawings, a generator, and where carburetting means are shown, the carburetor and superheater are shown in a more or less diagrammatic manner and are intended to represent typical apparatus for the manufacture of water gas.

Fig. 1 shows a blue water gas apparatus connected with a tar still in which distillation of the tar is effected by the hot waste gases from the blowing of the generator. The apparatus of Fig. 1 is more particularly adapted to carrying on a batch operation although a continuous distillation of the tar, that is, continuous distillation during the blow period, may be carried out in this apparatus by properly controlling the admission of tar to the still and the withdrawal of pitch therefrom.

The generator 1 is fitted with blast connection 2 and with steam connections 3 so that steam may be introduced either at the top or bottom of the fuel bed in the generator. The air blast main is provided with explosion doors (not shown). The charging door 4 and the clinkering doors (not shown) are of the usual type, and any suitable door means may be provided. The bottom gas off-take 6 leads into the main gas off-take 7 into which the top gas off-take 8 also leads. The main gas off-take 7 is connected with the dust catcher 9. The latter is provided with the off-take pipe 10 for hot waste "blow" gases and off-take pipe 11 for foul "make" gases. The pipe 11 is connected to the wash box 12, which serves to cool the foul "make" gases and delivers them to purifying means and storage. During the "blow" the valve 13 is open and the blow gases pass thru the main 10. During the "runs" the valve 13 is closed and the foul "make" gases pass thru the pipe 11 and wash box 12.

The generator 1 is operated in the usual manner. The blow in which the fuel bed is heated is alternated with the one in which water gas is produced. During the blow, the hot valve 13 is open so that the gases resulting from heating the fuel bed pass through the pipe 10, and, whereas they would ordinarily pass thence to the atmosphere or to a water boiler, according to this process, they are conducted to the still 14.

Tar is admitted to the still through the line 15, and the finished pitch is withdrawn through the draw-off 16. When operating as a batch process, the still is filled to the desired level with tar, the tar flow is cut off and the pitch outlet is closed. The gases are passed through the vapor space of the still and the tar is agitated in such a way as to throw particles of the tar up into the gas space and thus bring the tar particles into intimate contact with the gases. Distillation results and the gases enriched in vapors of condensable constituents pass through the main 17 to the condenser 18 where the distillate oils are removed from the gases and the gases then pass to the atmosphere. An exhauster 19 may be utilized where necessary, provided with means to permit operation of the same during the "blow" periods.

Any suitable type of agitating means may be employed within the still. In the drawings, agitators 20 are shown which comprise cones mounted on the shafts 21. Means for rapidly rotating the shafts is provided and the tar is thus sprayed up into the gases. Injectors, paddles, or other means for spraying the tar into the gases may be employed. Baffles 22 may be used at the gas inlet and outlet of the still. The gases and vapors leaving the still pass to the condenser 18 where oils are condensed and removed from the gases and collected in the tank 24. Either direct or indirect condensing means may be employed.

Where this type of apparatus is used for distilling a semi-continuous stream of tar, valves 25 and 26 in the tar inlet and pitch outlet from the still may be connected with means for operating the valves on the generator and the valve 13 so that during the blow when hot waste gases are passing through the still the valves 25 and 26 and the valve 13 are open and during the run these valves are closed.

Fig. 2 shows in diagrammatic manner means for practicing the invention in connection with a carburetted water gas plant. The drawings in Fig. 2 show a plant operated according to the back run process. During the "blow" period, the hot waste gases pass from the generator 30 through pipe 31 through the carburettor 32 and superheater 33 and through the hot gas pipe 35 to the tar distilling means 36. During the up run period of the water gas making period, gases pass from the generator 30 through the pipe 31, carburettor 32, superheater 33, pipe 98, valve 96 and pipe 99 to the wash box 37 from which the gases, cooled in the wash box, pass to the remainder of the plant through pipe 37'.

During the back run period of the gas making period, steam is admitted to the superheater through the pipe 97, passes through the superheater 33, the carburettor 32 and downwardly through the heated fuel in generator 30. The resulting foul gas passes through pipe 95, valve 96, pipe 99, wash box 37 and pipe 37' to the remainder of the gas plant. During the blow period, valve 96 closes the pipe 98. Valve 100 is open and allows hot waste gas to pass through pipe 35 to the tar still 36. During the up run, valve 100 is closed, valve 96 is open to the pipe 98 and closed to the pipe 95 and water gas passes through the pipe 98, valve 96, pipe 99 and the wash box 37 and thence to the remainder of the plant through the pipe 37'. During the back run, valve 96 is closed to the pipe 98, and open to the pipe 95 and the back run gas passes through pipe 95 and valve 96 and pipe 99 and through the wash box to the remainder of the plant through the pipe 37'.

The blast gases passing through the main 35 are used in the still 36 for distilling tar. The still is arranged for the counter-current flow of the tar and the gases through the still. Concurrent flow of the gases may be utilized or by dividing the gases and passing a part to each end of the still and taking the gases off from a point mid-way between the ends of the still and passing the tar through the still in one direction, the combined effect of concurrent and counter-current flow of the tar and the gases may be obtained.

The tar is fed to the still through the tar overflow box 38 through the pump 39 and line 39'. A constant level of tar in tank 38 is maintained by the overflow 41 which delivers back to the feed line at the point 40. The flow of tar from the feed box 38 to the still 36 is intermittent and the same control device 42 which operates the valves 100 and 96 for diverting the gases to either the still or the wash-box 37 operates the valve 50 which delivers tar to the tower 56 of the still. While the hot waste gases are passing through the apparatus and the gas main 35 to the still 36, tar flows from the tank 38 to the tower 56. When the valve 100 is closed and carburetted water gas is generated during the runs, the valve 50 is closed so that the flow of tar to the still is stopped and this automatically stops the withdrawal of pitch from the still. The pitch is withdrawn through the trap 51 and the leveling arm 52 and overflows to the trough 53 to suitable storage means. When the flow of tar to the still is stopped, the overflow of pitch from the leveling arm 52 automatically ceases. Agitating means for bringing the tar from the bottom of the still into contact with the hot gases passing through the vapor space of the still is provided. According to the arrangement shown in the drawings, the roll 54 dips to a slight extent into the body of tar maintained within the bottom of the still. The motor 55 is so connected with the roll as to rotate this roll at a speed of for example 900 to 1200 r. p. m. Thus there is produced an intense spray of tar up into the gases. Other agitating means may be provided. This spray of tar exposes a large surface of the tar to the action of the hot waste gases and provides effective means for distilling the tar. The gases and vapors resulting from the distillation pass up through the tower 56 to the gas main 57. The tar is advantageously fed from a tar feeding tank into the gases and vapors leaving the still, and for this purpose spray means 58 is provided within the tower 56. Baffling means 59 may be provided where desired to remove any entrained particles of spray carried over from the still into the tower and to expose a considerable surface of the tar to the gases leaving the still 36. The tower is of relatively large diameter and furthermore serves as a settling chamber to allow entrained particles of tar to settle out from the gases and return to the still.

The gases and vapors from the still pass through the main 57 to the condenser 60. The condenser is here shown as an indirect condenser, and the condensate is drawn off to the storage tank 61. The spray of tar within the still 36 is intense, and any entrained matter carried by the gases is removed from the gases so that on cooling the resulting gases and vapors clean distillate is obtained. Lighter oils not condensed in the condenser 60 and contained in the gases may advantageously be removed by scrubbing in a scrubber such as that shown at 62, in which any suitable solvent may be employed and which may be operated in the manner indicated which is similar to the ordinary means for removing light oils from gases and comprises the pump 63 and the line 64 which feeds the sprays 65.

Fig. 3 shows modified apparatus employing a tower still for the distillation. In the drawings the generator 70 and carburetor 71 are connected with the superheater 72 in the usual way. The hot waste gas main 73 connects with a scrubber tower 74 which may be of the usual type and is here shown as a simple tower provided at the top with spray means 75 supplied with tar from the line 76. Suitable baffling means may be employed, although this is not necessary. The tar is sprayed into the hot gases which rise through the scrubber tower and in passing down through the tower the tar is distilled. By regulating the rate of flow of tar through the tower, the extent of tar surface exposed to the gas, the height of the still and flow of the gases, and other conditions, regulated distillation of the tar will result and a pitch of desired melting point will be withdrawn from the bottom of the tower through the line 77. This may be recirculated if further distillation thereof is desired. The hot gases enriched in vapors resulting from the distillation pass through the main 78 to condensers not shown. The gases may be cooled in a single condenser or fractional condensing means may be provided, and where desired the condensers may be followed by scrubbers.

The usual water gas take-off 98a connects thru the wash-box 37a with the pipe 37b which conducts the partly cooled water gas to the remainder of the plant.

Fig. 4 shows means for scrubbing the hot water gases produced during the run periods of the generator, the tar employed for this scrubbing being partially distilled as a result thereof. The vapors and gases resulting from the topping operation may be cooled to recover these vapors and also scrubbed in any suitable manner. Residue from this operation, which comprises the topped tar, is then brought into intimate contact with the hot blast gases and thus distilled.

In Fig. 4, generator 80 is indicated as connected through carburetor 81 and superheater 82 to a hot blast gas main 83 and a hot water gas main 84. The main 84 is connected with the still 85 and the main 83 is connected with the still 86. These stills may advantageously be of the same general type as that described in connection with Fig. 2. The tar from storage flows to the still 85 thru the line 88. The tar is distilled and the gases pass through the main 89 to a condenser 90, and then to the usual washers, purifiers and storing means. The oils separated from the gases in the condenser 90 are drawn off into the oil storage tank 91. An exhauster may be employed for drawing the gases through the system, where necessary. Within the still 85 the tar is brought up into the vapor space of the still as an intense spray and the particles of pitch, etc., carried by the gases are scrubbed out of the gases, and the gases leaving the still through the main 89 are substantially de-tarred. Consequently the oils recovered in the condenser are substantially clean oils.

The partially distilled tar from the still 85 is drawn off to the storage tank 85' and supplied in the desired amount to the still 86.

In the still 86 the partly distilled tar is brought into intimate contact with the hot blast gases and the tar is further distilled and pitch of the desired melting point produced. The gases and tar are shown as passing through the still 86 in a countercurrent direction, although the direction of flow may be concurrent. Combinations of concurrent and countercurrent flow may be employed, e. g. the flow may be countercurrent in the tower and concurrent in the still 86. The pitch is drawn off to a pitch storage tank 93 through the pitch trap and outlet pipe. The gases from the still 86 pass to a suitable condenser 94 which may be a direct or indirect condenser. Distillate from the condenser is collected in the receiver 94'.

The gases from the still 86, after being cooled in the condenser 94, may be vented to the atmosphere without substantial loss of distillate oils, provided a sufficient proportion of light oils are preliminarily removed by distillation, as in the still 85. The proportion of light oil to be removed before distilling the residue in the still 86 will depend upon the nature and composition of the tar. The temperature of the condensing medium available for cooling the gases will also determine the extent to which removal of light oils is necessary.

The flow of gas to each still is intermittent, depending upon the "blows" and "runs" of the generator. During the blow periods, hot waste gases pass thru the still 86 and during the run periods, hot water gas passes thru the still 85. A control device 103 is shown for operating the valves which control the flow of the gases, and also valves admitting tar to the stills during the periods in which gases are passing thru the stills, and for shutting off the flow of tar to each still during the periods when hot gases are not passing thru them.

The control device 103 operates the valve 101 in the water gas main 84, and the valve 104 in the hot waste gas main 83. During the runs the valve 101 is open and the valve 104 is closed so that the water gas passes to the still 85. During the blow the valve 101 is closed and the valve 104 is open so that the waste gases go to the still 86.

The flow of tar to the still 85 is controlled by the valve 88' in the tar feed to this still, and the flow of tar from the storage tank 85' to the still 86 is controlled by the valve 86'. The valves in the tar and gas lines are synchronized to admit tar and gas to the respective stills at the same time.

The invention may be applied to either an ordinary water gas plant or a carburetted water gas plant as claimed below.

The term "water gas set" as herein employed, will be understood as meaning the apparatus as used in the art to produce either carburetted water gas or uncarburetted water gas, which is known as "blue" water gas.

I claim:

1. The method of distilling tar by the sensible heat in the blow gases from a water gas set which comprises, after passing steam through an incandescent bed of fuel, blowing the bed of fuel with air, bringing tar into direct contact with the hot gases resulting from the blowing operation in the form of a fine, intense spray whereby the gases are scrubbed and their temperature is suddenly lowered and the tar is rapidly distilled, and then cooling the resulting gases to condense clean oil.

2. The method of distilling tar by the sensible heat in the blow gases from a water gas set which comprises, after passing steam through an incandescent bed of fuel to form water gas, blowing the bed of fuel with air, bringing tar into direct contact with the hot water gas in such a way as to remove entrained particles from the gases and to simultaneously distill the tar, bringing the residue from this distillation into direct contact with the hot gases resulting from the blowing operation so as to further distill the tar, and cooling the gases and vapors resulting from each of the distillations separately to obtain distillate oils therefrom.

JOSEPH V. MEIGS.